Feb. 27, 1940.   A. F. TREMBLAY   2,191,733
METHOD AND APPARATUS FOR DELIVERING AND GATHERING GLASS
Filed Jan. 13, 1936   2 Sheets-Sheet 1
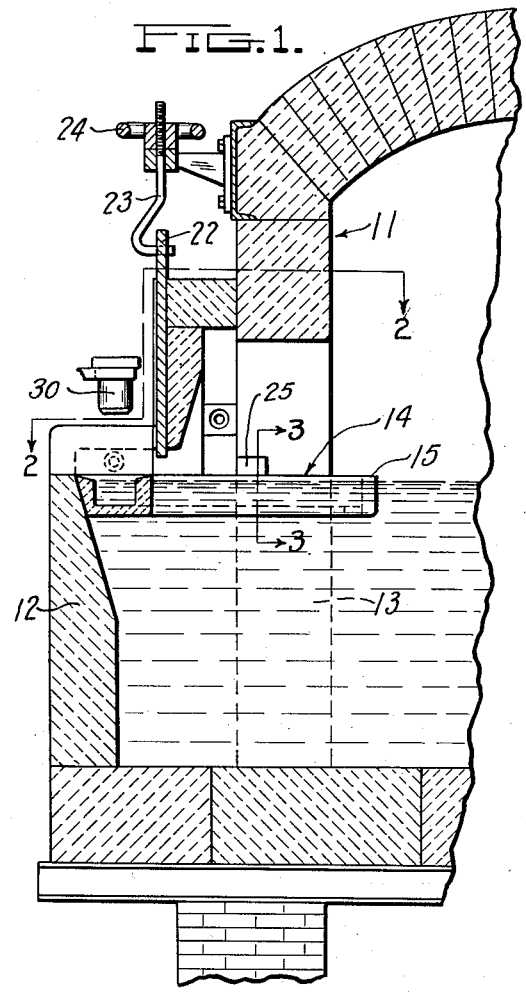
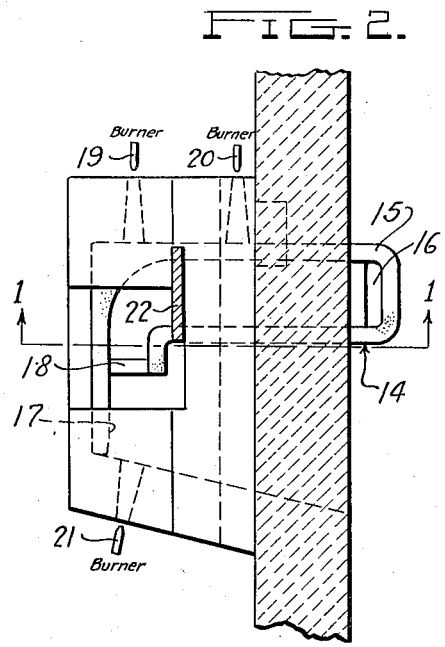
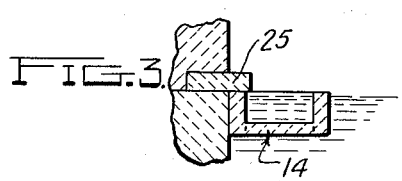
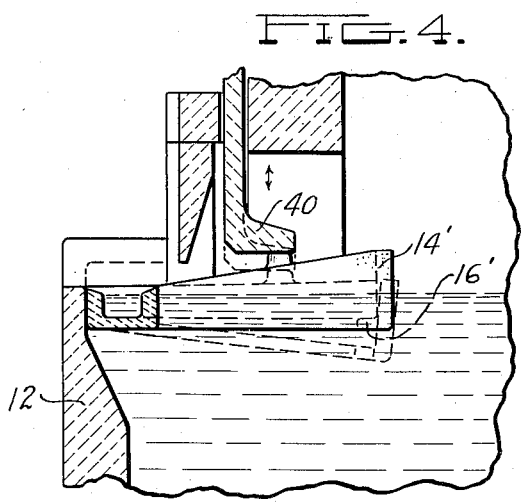
Inventor
Albert F. Tremblay
By Owen & Owen
Attorneys Feb. 27, 1940. A. F. TREMBLAY 2,191,733
METHOD AND APPARATUS FOR DELIVERING AND GATHERING GLASS
Filed Jan. 13, 1936 2 Sheets-Sheet 2
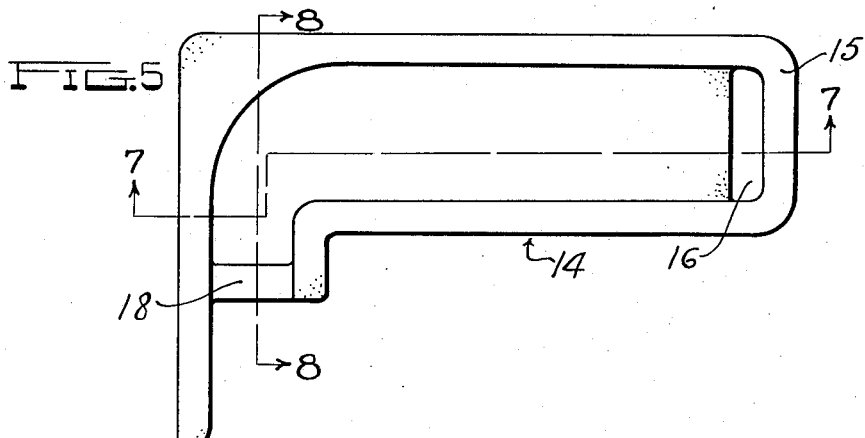
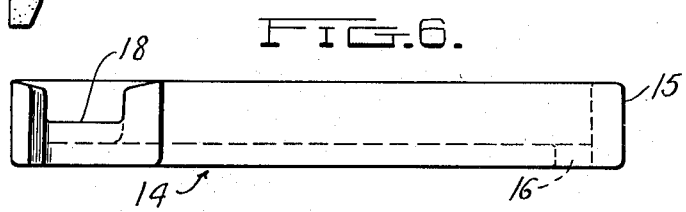
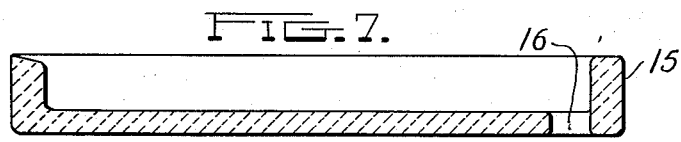
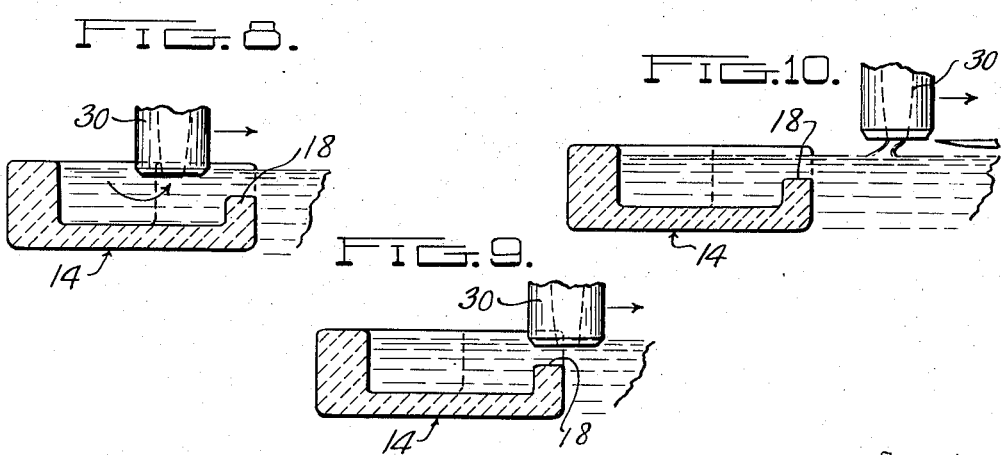
Inventor
Albert F. Tremblay
By Owen & Owen
Attorneys Patented Feb. 27, 1940

2,191,733

UNITED STATES PATENT OFFICE 2,191,733

METHOD AND APPARATUS FOR DELIVERING AND GATHERING GLASS

Albert F. Tremblay, Toledo, Ohio, assignor to Kent-Owens Machine Company, Toledo, Ohio, a corporation of Ohio Application January 13, 1936, Serial No. 58,856

26 Claims. (Cl. 49—56)

This invention relates to a method of and apparatus for delivering and gathering glass, and has for its object the deliverance and gathering of glass from a tank furnace so as to obtain the gathers in proper temperature condition and without contamination by chilled glass or otherwise.

Other objects and details of the invention will appear as the description proceeds.

In the accompanying drawings forming a part of this specification, Figure 1 is a vertical section through one form of apparatus embodying the invention; Fig. 2 is a horizontal section partly in plan approximately upon the line 2—2 of Fig. 1; Fig. 3 is a detail vertical section approximately on the line 3—3 of Fig. 1; Fig. 4 is a view similar to Fig. 1, but showing a modified form of apparatus; Fig. 5 is a plan view of the float or delivery trough shown in connection with Figs. 1, 2 and 3; Fig. 6 is an elevation of the float or delivery trough shown in Fig. 5 taken from the delivery side; Fig. 7 is a section of the float or delivery trough on the line 7—7 of Fig. 5; Figs. 8, 9 and 10 are sections taken along the line 8—8 of Fig. 5 and showing diagrammatically three successive positions of the gathering device during the gathering operation.

In the construction shown in Fig. 1, there is illustrated a tank furnace 11 which may be of any usual construction and having a forebay 12 opening from the side of the tank through archway 13. Floating in the glass, or fixed in position as preferred, there is a float or delivery trough 14 having one end 15 extending into the furnace and having a receiving opening 16 in the bottom thereof. Member 14 provides a generally L-shaped trough as indicated in Figs. 2 and 5, the left end of the trough, as shown in the drawings, being provided with a nose or extension 17 which assists in retaining the member in proper position. The left or outlet end of the trough is shown as being provided with a slightly raised dam 18. Burners 19, 20 and 21 may be provided at suitable points for heating the glass in the trough and in the forebay. In the construction shown in Fig. 1, there is a gate 22 in front of the furnace wall and over the float or delivery trough. This gate is suspended by a member 23 which may be vertically adjusted by a hand wheel 24 or other suitable means. The float or delivery trough 14 is shown held in depressed position by a block 25 projecting from the furnace wall.

There is shown diagrammatically for illustrative purposes a gathering device or mold 30 which is moved by any suitable means, over the forebay and lowered thereinto during this movement, as illustrated in Figs. 8, 9 and 10. As shown in those figures, the gathering is done principally at a point just inside the dam 18, after which the mold or gathering device moves laterally over the dam to the position in which it is shown in Fig. 9, and by this movement carries with it over the dam the glass which has contacted the mold or gathering device during the charging thereof, which may be caused by any suitable suction means. Thereafter, the mold or gathering device is raised to the position in which it is shown in Fig. 10 and the glass cut off, this sheared glass dropping into the pool to the right of the delivery trough as viewed in Figs. 8, 9 and 10.

The construction shown in Fig. 4 is similar to that shown in Fig. 1, except that the member 14' is indicated as being deeper at the inner end than at the outer end, and as capable of adjustable depression, which may be caused by a vertically adjustable member 40 resting upon the float. Similar, or other suitable, means may be employed for adjusting the vertical position of the entire trough member, if desired.

The operation of the device will be apparent from the foregoing description, but will be briefly described, to indicate the principles upon which the invention works and thereby to indicate the approximate scope of the invention.

It will be readily understood that, as glass is being sucked up by the gathering device in the position illustrated in Fig. 8, glass will flow to the gathering point. However, the glass over dam 18 is not only restricted in cross-section by the dam, but is also chilled both by the presence of this dam and by the operation of the mold device, as will be more fully explained later. Accordingly, the flow of the glass towards the gathering point is upward through opening 16 and along the trough to the gathering point, there being practically no reverse flow over dam 18.

As the gathering device or mold moves over dam 18, it moves with it the glass which has contacted the gathering device and has been somewhat chilled thereby. This aids in lowering the temperature of the glass over dam 18 and reduces the danger of return flow of the glass over dam 18 into the delivery trough. A certain amount of glass moves with the moving mold or gathering device over the dam from left to right, as indicated in Figs. 8, 9 and 10. The mold or gathering device is raised and the connecting glass sheared off after it has passed over the dam, as indicated in Fig. 10.

The comparatively cooled condition of the glass over dam 18 does not stiffen it sufficiently to constitute any material resistance to the movement of the mold or gathering device, but does render it enough stiffer than the glass in the trough so that it restricts backward flow and insures the flow of the glass to the gathering point from entrance opening 16 and along the trough.

It will be readily seen that, by this means, the glass is taken from a point within the tank and below the surface thereof where clear, uniform glass in satisfactory condition may be obtained, and that, as this glass flows in a relatively shallow stream along the trough 14 to the gathering point, the temperature thereof may be controlled by suitable burners and/or by adjustment of gate 22. The mold or gathering device removes from the trough at each gathering operation any glass that is chilled by that operation, leaving the glass within the trough in perfect condition for the next gathering operation. At the same time there is no unnecessary movement of the glass or agitation which will introduce bubbles or striations or otherwise disturb the uniform quality of the gathered glass.

Where the level of the glass in the tank and the character of the gathering operations is substantially constant, the trough may be fixed in position and to a certain extent variations in the gathering operation and even variations of the temperature within the furnace may be met by adjustment of gate 22, or other equivalent means for adjusting the opening from the tank over the gathering trough, so as to adjust the heating effect from the tank over the trough at this point. Also, burners suitably placed may assist in this temperature control.

The construction shown in Fig. 4 illustrates somewhat diagrammatically another method of temperature control and conjointly therewith control of the distance below the surface of the glass from which the glass to be gathered is taken. It will be readily understood that as member 40 is moved upward or downward the inner end of float 41 is also moved upward or downward and that the distance of opening 16' below the glass level in the furnace is varied with this raising and lowering of the inner end of the float. At the same time the depth of glass over the bottom of the trough between the inlet and the gathering point is likewise varied, this in turn varying the quantity of glass in the trough at one time. It will be readily understood that the higher the float and the less glass there is in the trough at one time, the fewer gathers will be required to use up the glass in the trough and result in a complete refilling thereof. By allowing the inner end of the trough to rise to the highest practicable position, the movement of the stream of glass in the trough is speeded up so that there is comparatively little time for the glass to change its temperature while it is in the trough. Also, it will be readily understood that heating or cooling the surface of a shallow stream more quickly affects the stream to substantially its full depth than is the case with a relatively deep stream. Accordingly, the elevation or depression of the inner end of the float in the manner indicated in Fig. 4, can be employed to regulate the speed with which the glass stream travels along the trough from the entrance to the delivery end, and also may be employed to regulate the temperature control of the glass during that flow. At the same time it regulates the depth below the surface at which the glass enters the trough, and the condition of the glass is affected by that depth.

It will be understood that the entire trough member may be adjusted vertically to take care of different depths of glass in the tank, and also to further govern the condition of the glass, or the front and rear ends might be adjusted separately. Other obvious variations in arrangement and adjustment may be made.

While the receiving opening in the trough is shown through the bottom of the trough, the location and arrangement of this opening may be varied, it being advantageous, however, to keep the entire opening below the surface of the glass, to avoid imperfections in the glass at its surface.

What I claim is:

1. The method of gathering glass from a pool of molten glass which comprises segregating a portion of the surface layer of the pool from the surrounding glass except at one narrow portion at the surface, and from the underlying glass except at a point spaced from said narrow portion, gathering glass from the segregated portion, moving glass that is chilled by said gathering operation away from the segregated portion into the surrounding portion through said narrow connecting portion, and producing an inflow from the underlying glass at said spaced point.

2. A method in accordance with claim 1, and comprising controlling the temperature of the glass and thereby conditioning the glass during its passage between said spaced point and said narrow portion.

3. The method of gathering glass from a pool of molten glass which comprises segregating a portion of the surface layer of the pool from the surrounding glass except at one narrow portion at the surface, and from the underlying glass except at a point spaced from said narrow portion, gathering glass from the segregated portion, moving glass that is chilled by said gathering operation away from the segregated portion into the surrounding portion through said narrow connecting portion, producing an inflow from the underlying glass at said spaced point, and varying the depth of the segregated portion and thereby governing the rate of flow and temperature of the glass in said segregated portion.

4. The method of gathering glass from a pool of molten glass which comprises segregating a portion of the surface layer of the pool from the surrounding glass except at one narrow portion at the surface, and from the underlying glass except at a point spaced from said narrow portion, gathering glass from the segregated portion, maintaining the glass at said narrow portion cooler than the glass in said segregated portion, but sufficiently plastic to allow the easy passage of a gathering device therethrough, and moving the glass chilled by said gathering operation through said narrow portion by movement of the gathering device through said narrow portion.

5. The method of gathering glass from a pool of molten glass, which consists in cooling a portion of the surface of the pool while retaining it in sufficiently plastic condition to allow the ready passage of a gathering device therethrough, gathering glass from the surface on one side of said cooled portion, and moving the gathering device through said portion and thereby moving glass chilled by the gathering operation through and to the other side of said cooled portion.

6. The method of gathering glass by a suction gatherer from a pool of molten glass having therein a segregating member with a notch in one edge extending below the surface of the glass, which consists in immersing the lower end of the gatherer into the glass in the segregating member and sucking up glass into the gatherer, then moving the lower end of the gatherer through the notch and from the segregating member while said end is still dipped in the glass, and thereafter raising the gatherer and shearing the molten glass from the bottom thereof.

7. In glass working apparatus, a receptacle for a pool of molten glass, a member positioned in said pool and having a trough in its upper surface with a notch through the side of the trough providing connection between the surface of the glass within the trough and at the side thereof, and an opening through the member providing connection between the glass in the trough and that outside thereof, said connection normally lying entirely below the surface of the glass.

8. Apparatus in accordance with claim 7 and wherein the trough is elongated and said notch and said opening are at opposite ends thereof.

9. Apparatus in accordance with claim 7 and wherein the trough is elongated and said notch and said opening are at opposite ends thereof, and said member is positioned with its notch near the side of the pool and its said opening farther from the side of the pool.

10. Apparatus in accordance with claim 7 and wherein the trough is elongated and said notch and said opening are at opposite ends thereof, and said member is positioned with its notch near the side of the pool and its said opening farther from the side of the pool, and means to condition the glass in said trough.

11. Apparatus in accordance with claim 7 and wherein the trough is elongated and said notch and said opening are at opposite ends thereof, and said member is positioned with its notch near one side of the pool and its said opening farther from said side of the pool, and burners in position to heat the glass in said trough.

12. In glass working apparatus, a receptacle for a pool of molten glass, a member positioned in said pool and having a trough in its upper surface with a notch through the side thereof and near the front side of the pool and there being an opening through the member providing connection between the glass in the trough and that outside thereof, said connection normally lying entirely below the surface of the glass and in the opposite end of said member from said notch and at the end nearer the center of the pool, and means to adjust vertically the rear end of said trough member.

13. Apparatus in accordance with claim 7 and wherein said trough member is L-shaped with its said notch at the end of one limb of the L and its said opening at the end of its other limb.

14. In glass working apparatus, a tank furnace having a forebay, a member having a trough in its upper side and extending from the forebay towards the interior of the tank, said member having a notch in the side of the front end of its trough and extending below the glass level and an opening at the rear end of the trough and entirely below the normal level of the glass.

15. In glass working apparatus, a tank furnace having a forebay, a member having a trough in its upper side and extending from the forebay towards the interior of the tank, said member having a notch in the side of the front end of its trough and an opening at the rear end of the trough, said notch extending below the level of the glass but being shallower than said trough, and said opening being entirely below the normal level of the glass.

16. In glass working apparatus, a tank furnace having a forebay, a member having a trough in its upper side and extending from the forebay towards the interior of the tank, said member having a notch in the side of the front end of its trough extending below the level of the glass and an opening through the rear end of the trough, and entirely below the normal level of the glass, the tank having a wall over the glass between the forebay and body of the tank, and means for adjusting the opening under said wall and over said trough member.

17. In glass working apparatus, a tank furnace having a forebay, a member having a trough in its upper side and extending from the forebay towards the interior of the tank, said member having a notch in the side of the front end of its trough and an opening at the rear end of the trough, and entirely below the normal level of the glass, and means to adjust vertically the rear end of the trough.

18. In glass working apparatus, a tank furnace having a forebay, a member positioned in the glass in said furnace and having an L-shaped trough in its upper surface with one limb of the L lying adjacent to and parallel with the front of the furnace and the other limb extending rearwardly, there being a notch in the end of said forward limb extending below the level of the glass and an opening through said rearwardly extending limb, and entirely below the normal level of the glass.

19. Apparatus in accordance with claim 18 and in which said notch is shallower than said trough.

20. In apparatus in accordance with claim 18, means to condition the glass in said trough.

21. In apparatus in accordance with claim 18, burners arranged to direct heat upon said trough.

22. Apparatus in accordance with claim 18 and the tank having a wall over the glass between said forebay and the body of the tank, and means for adjusting the opening beneath said wall and over said trough member.

23. In glass working apparatus, a tank furnace having a forebay, a member positioned in the glass in said furnace and having an L-shaped trough in its upper surface with one limb of the L lying adjacent to and parallel with the front of the furnace and the other limb extending rearwardly into the tank, there being a notch in the end of the forward limb and an opening through said rearwardly extending limb and entirely below the normal level of the glass, and means for adjusting vertically the rear end of said trough member.

24. In glass working apparatus, a receptacle for a pool of molten glass, a member positioned in said pool and having a trough in its upper surface with a notch through one side of the trough providing connection between the surface of the glass within the trough and outside thereof and an opening into the trough at a point spaced from said notch and entirely below the normal level of the glass, and means to adjust said member vertically.

25. In glass working apparatus, a receptacle for a pool of molten glass, a member positioned in said pool and having a trough in its upper surface with a notch through one side of the trough providing connection between the surface of the glass within the trough and outside thereof and an opening into the trough at a point spaced from said notch and entirely below the normal level of the glass, and an adjustable screen over the trough between said notch and said opening.

26. In glass working apparatus, a tank furnace having a forebay and a wall over the glass between the forebay and body of the tank, a member having an L-shaped trough in its upper surface and positioned in the glass in the tank with one limb of its L-shaped trough adjacent to and parallel with the front of the forebay and the other limb of said trough extending rearward into the tank, there being a notch in the end of the forward limb of the trough and an opening through the bottom of the rear end of the other end of the trough, said notch being shallower than said trough but deep enough to go below the normal level of the glass, burners in position to heat the glass in the trough, and an adjustable gate in position to adjust the space over said trough and beneath said wall.

ALBERT F. TREMBLAY.